United States Patent Office 3,792,155
Patented Feb. 12, 1974

3,792,155
METHOD FOR INCREASING THE CARBON YIELD OF INDENE-DERIVED CARBON PRECURSORS
Wesley E. Smith and Ottis J. Horne, Jr., Oak Ridge, Tenn., assignors to the United States of America as represented by the United States Atomic Energy Commission
Filed Apr. 27, 1972, Ser. No. 248,324
Int. Cl. C01b 31/02, 31/04
U.S. Cl. 423—448                                3 Claims

ABSTRACT OF THE DISCLOSURE

The carbon yield of carbon precursors is substantially increased and the microstructure of graphite prepared from this carbon is reproducibly controlled by the addition of selected quantities of pyromellitic dianhydride to the carbon precursors.

---

This invention relates generally to the preparation of carbon and graphite from carbon precursors of indene derivatives, and more particularly to the control of the crystalline structure of the graphite and the increase in carbon yield from such precursors. This invention was made in the course of, or under, a contract with the U.S. Atomic Energy Commission.

Carbon and graphite are recognized as important structural materials in nuclear reactors, aerospace applications, and other technologies where the high temperatures and corrosive chemical activities are encountered. There have been some shortcomings or drawbacks which have detracted from or even discouraged the use of carbon and graphite for some applications. For example, the lack of controlled reproducibility of the crystalline structures in graphite and the lack of satisfactorily high carbon yields from various carbon precursors are significant problems in the manufacture of carbon and graphite.

Accordingly, the primary objective or aim of the present invention is to provide a method for increasing the carbon yields and for selectively controlling the crystalline structure of graphite manufactured from carbon prepared from thermoplastic derivatives of indene. These goals are achieved by adding selected quantities of pyromellitic dianhydride (PMDA) to the precursor of an indene-derived resin such as truxene, isotruxene, and cinnamylideneindene.

Other and further objects of the invntion will be obvious upon an understanding of the illustrative method about to be described, or will be indicated in the appended claims, and various advantages not referred to herein will occur to one skilled in the art upon employment of the invention in practice.

Graphs relating to various mixtures of precursors of indene-derived resins and PMDA have been chosen for the purpose of illustrating and describing the invention. These graphs are not intended to be exhaustive or to limit the invention to the precise mixtures disclosed. They are chosen and described in order to best explain the principles of the invention and their application in practical use to thereby enable others skilled in the art to best utilize the invention in various embodiments and modifications as are best adapted to the particular use contemplated.

Figure 1:
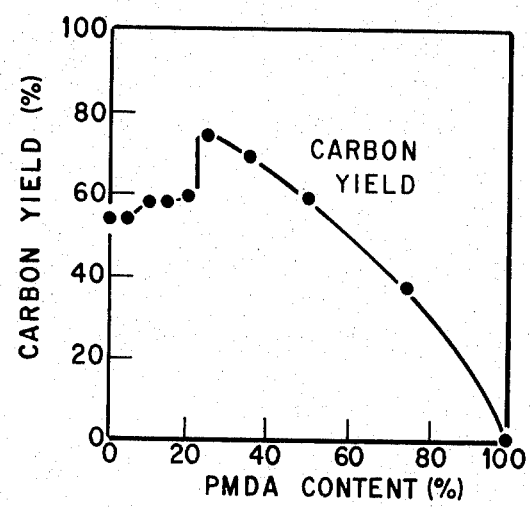
Figure 2:
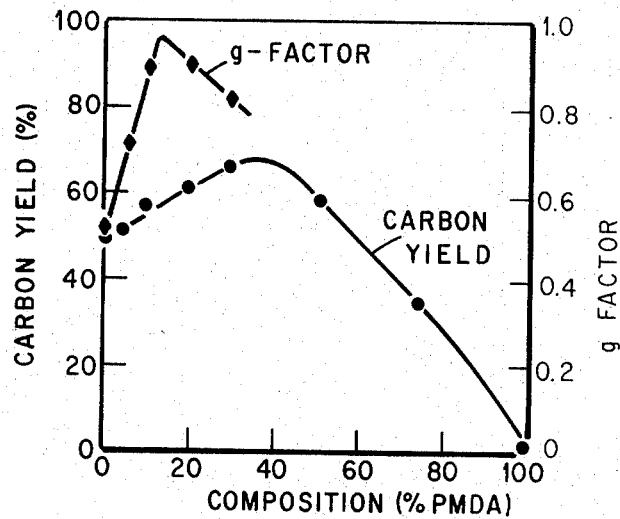
Figure 3:
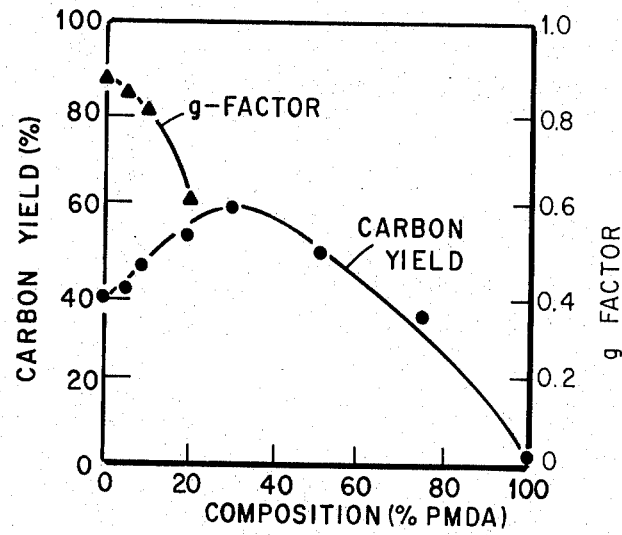

In the accompanying drawing:
FIG. 1 is a graph illustrating the carbon yield obtained from truxene and PMDA mixtures;
FIG. 2 is a graph illustrating the carbon yield and degree of graphitization (g-factor) obtained from isotruxene and PMDA mixtures; and
FIG. 3 is a graph showing the carbon yield and g-factor obtained from cinnamylideneindene and PMDA mixtures.

Described generally, the present invention is directed to the preparation of carbon and graphite from thermoplastic resins derived from precursors such as truxene, isotruxene, and cinnamylideneindene. The precursors for the thermoplastic resins are mixed with preselected quantities of pyromellitic dianhydride to substantially increase the carbon yield over that obtainable with the precursors alone when the mixtures are carbonized at a temperature in the range of about 900°–100° C. The carbon resulting from the coking of isotruxene or cinnamylideneindene mixtures can be converted to graphite by heating these carbons to a temperature in the range of about 2800°–3000° C. with the graphite having decreased graphiticity and a reproducibile crystalline structure depending upon the quantity or percentage of PMDA added to the precursors.

Pyromellitic dianhydride, which contains approximately 44 percent oxygen, thermally decomposes during an endothermic reaction at a temperature above 300° C. to produce highly reactive benzyne intermediates which serve as cross-linking agents for the indene-derived carbon precursors. The cross-linking introduced by the benzyne intermediates increases the molecular weight of the thermoplastic polymer so as to decrease the vapor pressure of the latter which facilitates increased carbon yields. Enhanced or increased cross-linking in a thermoplastic carbon precursor tends to decrease the crystallinity of a carbon by decreasing the molecular mobility that is needed for orientation or crystallization processes required to effect the formation of graphite. Controlling the extent of this cross-linking by adding selected quantities of PMDA to the resin precursors provides a somewhat positive mechanism for controlling the crystalline structure of the graphite in a highly reproducible manner.

The endothermic reaction resulting in the degradation of the PMDA causes the evolution of considerable quantities of carbon monoxide and carbon dioxide. Products formed when the PMDA degrades and when the resulting benzyne intermediates polymerize are apparently volatile or degrade at higher temperatures since only a low char yield and essentially no carbon residue are observed when PMDA is heated to carbonizing temperatures. Accordingly, since PMDA contains 44 percent oxygen and gives a low char yield on pyrolysis, the thermoplastic resin precursors-PMDA mixtures have carbon yields significantly higher than would be anticipated from weight averaging calculations of the components, particularly since such mixtures containing about 50 weight percent PDMA have higher carbon yields than the precursor alone.

It has been found that satisfactory control of the increased carbon yield from the aforementioned resin precursor-PMDA mixtures can be provided by employing PMDA in concentrations ranging from an effective or a finite amount near 0 weight percent which will result in a finite increase in carbon yield or change in the crystalline structure to about 50 weight percent. Concentrations greater than about 50 weight percent result in carbon yields less than obtainable from the precursor alone and provide little variation in the carbon properties.

In order to more clearly set forth features of the present invention examples relating to typical preparations of carbon and graphite from mixtures of indene-derived resins precursors and PMDA are set forth below.

EXAMPLE I

With a carbon precursor of truxene the carbon yield is increased from 40 weight percent to 75 weight percent with the addition of the PMDA in the range of a finite quantity near 0 to 55 weight percent. The greatest increases in carbon yield occurs with a PMDA addition in the range of 20 to 25 weight percent as will be apparent from viewing FIG. 1 as well as Table I below where ten PMDA-truxene mixtures with different PMDA concentrations were carbonized in an argon atmosphere at 1000° C. with six of the resulting carbons being heated to 2800° C. The PMDA concentration in the mixtures ranged from 0 to 100 weight percent. Each of the blended mixtures had a total weight of approximately 30 grams and was prepared by mixing dry powders in a kitchen-type blender. The temperature was increased at a rate of about 15° C. per hour to 1000° C. with no hold time at the peak temperature. The properties of the carbons after heating to 2800° C. are shown in the table by the average thickness ($L_c$ in A.) of the graphite crystals and by the interlayer spacing ($d_{004}$ in A.) of the crystals as taken along the 004 plane, both of which were determined by X-ray diffraction. Another property of the carbon is shown by the degree of graphitization or g-factor of the carbon material. The g-factor which, in effect, represents the percentage of carbon converted to graphite is determined by the formula $$d_{002} = (g)\ 3.354 + (1-g)\ 3.44$$

The numbers 3.44 and 3.354 are measurements in angstroms relating to the interlayer spacings of amorphous carbon and crystalline graphite, respectively. These numbers characterize all forms of carbons heated to temperatures as high as 3000° C. which show the g-factor with the numeral 1.0 being representative of complete conversion of the carbon to graphite.

TABLE I.—PROPERTIES OF CARBONS DERIVED FROM TRUXENE-PYROMELLITIC DIANHYDRIDE MIXTURES

| Sample number | Percent PMDA content | Carbon yield after 1,000° C. | Properties after 2,800° C. | | |
|---|---|---|---|---|---|
| | | | $d_{004}$ (A.) | G-factor | $L_c$ (A.) |
| A | 0 | 54 | 1.7039 | 0.365 | 65 |
| B | 5 | 54 | 1.7143 | 0.129 | 49 |
| C | 10 | 59 | 1.7098 | 0.235 | 60 |
| D | 15 | 59 | 1.7104 | 0.224 | 66 |
| E | 20 | 60 | 1.7095 | 0.247 | 54 |
| F | 25 | 75 | 1.7086 | 0.271 | 66 |
| B1 | 35 | 70 | | | |
| B2 | 50 | 60 | | | |
| B3 | 75 | 38 | | | |
| B4 | 100 | 1 | | | |

Carbon prepared from truxene does not convert to graphite and the properties resulting from the truxene-PMDA mixtures. The pyromellitic dianhydride content in from the truxene alone since the microstructures of these carbons when heated to 2800° C. show no crystalline phase. Thus, the truxene-PMDA mixtures are useful primarily for preparation of carbon products.

EXAMPLE II

Eight separate mixtures of isotruxene and pyromellitic dianhydride were dry blended and carbonized at 1000° C. in a manner similar to the aforementioned truxene-PMDA mixtures. The promellitic dianhydride content in the mixtures ranged 0 to 100 weight percent. Data obtained from the eight separate mixtures are shown in Table II and FIG. 2. The graph in FIG. 2 shows that the coke yield values reach a maximum as the pyromellitic dianhydride content approaches 35 weight percent with the graphitic properties, as expressed in terms of g-factors, reaching a maximum for compositions containing about 20 weight percent pyromellitic dianhydride. The data obtained showed that the carbon yields gradually increased from a low of 49 percent to 66 percent as the PMDA content was increased from a finite amount near 0 weight percent to 30 weight percent. The most significant microstructural change in the isotruxene-pyromellitic dianhydride mixtures occurred as the pyromellitic dianhydride content increased from a finite amount near 0 to 5 weight percent. Such mixtures were carbonized to determine more accurately the effect of these lower pyromellitic dianhydride concentrations upon the microstructure of the derived carbon. The graphiticity of the derived carbons increased steadily as the PMDA content increased to 5 weight percent.

TABLE II.—PROPERTIES OF CARBON DERIVED FROM ISOTRUXENE-PYROMELLITIC DIANHYDRIDE MIXTURES

| Sample number | Percent PMDA content | Carbon yield after 1,000° C. | Properties after 2,800° C. | | |
|---|---|---|---|---|---|
| | | | $d_{004}$ (A.) | G-factor | $L_c$ (A.) |
| 91-A | 0 | 49 | 1.6986 | 0.506 | 116 |
| 91-B | 5 | 51 | 1.6897 | 0.718 | <100 |
| 91-C | 10 | 57 | 1.6822 | 0.894 | 297 |
| 91-D | 20 | 61 | 1.6817 | 0.906 | 457 |
| 92-A | 30 | 66 | 1.6848 | 0.824 | 161 |
| 92-B | 50 | 57 | | | |
| 92-C | 75 | 35 | | | |
| 92-D | 100 | 4 | | | |

EXAMPLE III

Cinnamylideneindene (CAI)-pyromellitic dianhydride mixtures provide substantial increases in carbon yield as well as a desirable control of the properties of the graphite obtained from the heating of the carbon prepared from these mixtures. Substantial increases in carbon yield are achieved with a finite amount of PMDA near 0 weight percent to about 55 weight percent in the precursor mixture with the maximum yield of 60 percent being achieved with the addition of about 30 weight percent PMDA. However, if a graphite product is desired the use of greater than 20 weight percent PMDA results in a non-graphitic carbon. To this end 10 to 20 weight percent PMDA provides significant changes in the microstructure and the g-factor of the carbon as shown below in Table III and in FIG. 3 of the drawing. Eight CAI mixtures containing 0 to 100 weight percent PMDA were prepared and carbonized in a manner similar to the truxene-PMDA mixtures described above.

TABLE III.—PROPERTIES OF CARBON DERIVED FROM CINNAMYLIDENEINDENE-PYROMELLITIC DIANHYDRIDE MIXTURES

| Sample number | Percent PMDA content | Carbon yield after 1,000° C. | Properties after 2,800° C. | | |
|---|---|---|---|---|---|
| | | | $d_{004}$ (A.) | G-factor | $L_c$ (A.) |
| 93-A | 0 | 39 | 1.6820 | 0.894 | 281 |
| 93-B | 5 | 40 | 1.6836 | 0.859 | 226 |
| 93-C | 10 | 47 | 1.6851 | 0.824 | 169 |
| 93-D | 20 | 54 | 1.6943 | 0.600 | 101 |
| 94-A | 30 | 60 | Nongraphitic | | |
| 94-B | 50 | 48 | Nongraphitic | | |
| 94-C | 75 | 35 | Nongraphitic | | |
| 94-D | 100 | 4 | Nongraphitic | | |

While the above description is primarily directed to the preparation of carbon and graphite from truxene, isotruxene and cinnamylideneindene, other indene-derived resin precursors such as benzylideneindene and anthrylideneindene show increased carbon yield and graphite crystallinity control by employing various concentrations of pyromellitic dianhydride therewith. It will be seen that the present invention provides a unique mechanism for selectively providing increased carbon yields and control of the crystalline structure of graphite prepared from such carbons in a readily reproducible manner so as to significantly overcome many of the problems heretofore encountered in the preparation of carbon and graphite structures.

What is claimed is:

1. In the method of preparing carbon from a carbon precursor selected from the group consisting of truxene, isotruxene, and cinnamylideneindene by heating said precursor in an inert atmosphere to a carbonizing temperature, the improvement comprising increasing the carbon yield of said precursor by the step of mixing pyromellitic dianhydride with the precursor prior to carbonizing, said pyromellitic dianhydride being of a concentration in said mixture in the range of a finite quantity near 0 weight percent sufficient to provide a finite increase in carbon yield to a maximum about 50 weight percent.

2. The method claim in claim 1 wherein the carbon precursor is isotruxene, the maximum concentration of pyromellitic dianhydride is about 5 weight percent, and wherein the carbon resulting from said heating is subjected to a further heating at a temperature adequate to convert the carbon to graphite.

3. The method claimed in claim 1 wherein the carbon precursor is cinnamylideneindene, the maximum concentration of pyromellitic dianhydride is about 20 weight percent, and wherein the carbon resulting from said heating is subjected to a further heating at a temperature adequate to convert the carbon to graphite.

References Cited

UNITED STATES PATENTS

| | | | |
|---|---|---|---|
| 3,535,081 | 10/1970 | Harper et al. | 423—448 |
| 2,915,370 | 12/1959 | Mitchell | 423—448 |
| 2,697,028 | 12/1954 | Baker et al. | 423—449 X |

EDWARD J. MEROS, Primary Examiner

U.S. Cl. X.R.

264—29; 423—445, 449